United States Patent [19]
Bastian

[11] Patent Number: 4,598,554
[45] Date of Patent: Jul. 8, 1986

[54] CRYOGENIC PRESSURE BUILDING SYSTEM

[75] Inventor: Dale E. Bastian, San Ramon, Calif.

[73] Assignee: Richmond Lox Equipment Company, Livermore, Calif.

[21] Appl. No.: 702,578

[22] Filed: Feb. 19, 1985

[51] Int. Cl.[4] .............................................. F17C 7/02
[52] U.S. Cl. ........................................ 62/51; 62/52; 165/41; 165/183; 165/108
[58] Field of Search .............. 165/41, 44, 183, 104.19, 165/108; 62/50-53, 55

[56] References Cited

U.S. PATENT DOCUMENTS

| | | | |
|---|---|---|---|
| 1,834,736 | 12/1931 | Purdy | 165/183 |
| 3,293,871 | 12/1966 | Tyree, Jr. | 62/52 |
| 3,724,426 | 4/1973 | Brown | 62/52 |

FOREIGN PATENT DOCUMENTS 680032 2/1964 Canada .................................. 62/52

Primary Examiner—Albert W. Davis, Jr.
Attorney, Agent, or Firm—Bielen and Peterson

[57] ABSTRACT

A pressure building system for cryogenic material for use on a mobile cryogenic tank such as a railroad car utilizing an elongated conduit which includes at least one fin bonded to the outer wall of the conduit along the length of the same. The conduit and bonded fin are constructed of heat conductive material such as stainless steel. The pressure building system is supported to the mobile cryogenic tank such that the output of the cryogenic tank communicates with the inlet of the conduit.

8 Claims, 4 Drawing Figures

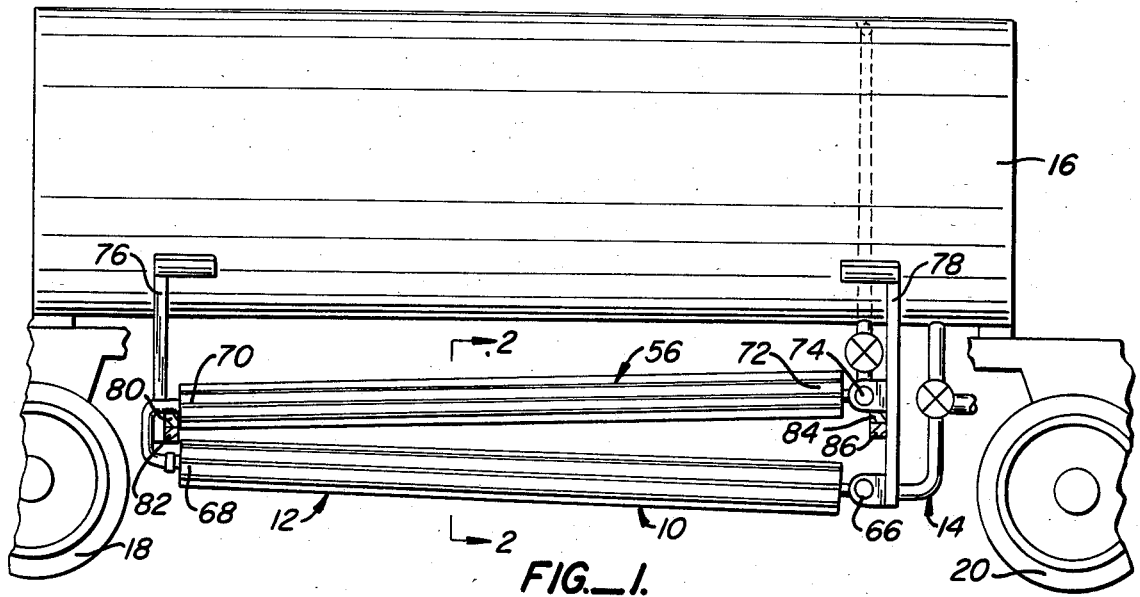
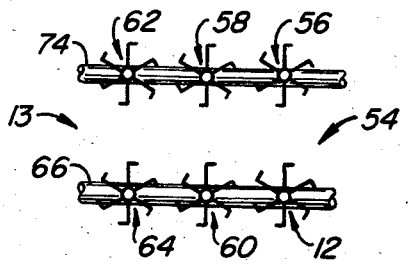
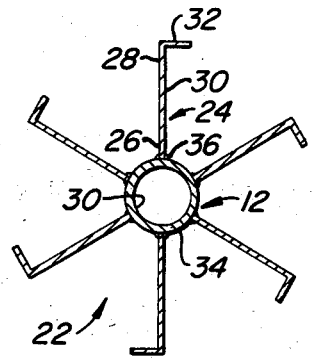
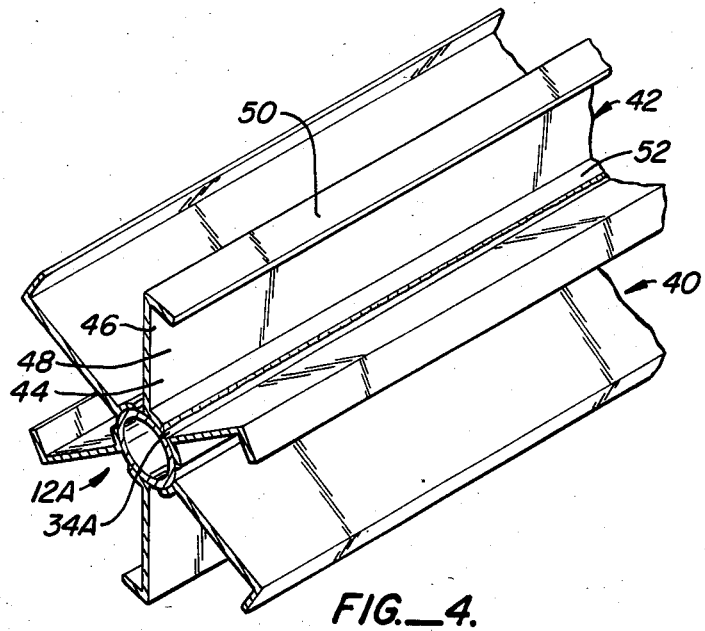

CRYOGENIC PRESSURE BUILDING SYSTEM

BACKGROUND OF THE INVENTION

The present invention relates to the field of transportation and distribution of cryogenic liquids.

Cryogenic liquids are generally transported in insulated tanks which may be considered to be pressure vessels. Such cryogenic vessels may travel by rail, road or over water.

At the ultimate destination the cryogenic material may be vaporized for use or vaporized in part to aid in the pumping of the cryogenic liquid from the cryogenic vessel.

In the past aluminum pipes exposed to the ambient air were employed to vaporize the cryogenic material tapped from the cryogenic vessel. Also heat exchange fins have been clamped or wound to the aluminum pipe. Although aluminum is a good conductor of heat, the vibration and shock inherent to a particular transportion system eventually weakened and caused failure of prior vaporizers of this type.

In addition, cryogenic materials that are deemed to be flammable, such as oxygen, hydrogen, and the like cannot safely be used with aluminum material under certain regulations.

A pressure building system which permits the use of stainless steel conduits and possesses superior durability would be an advance in the art of cryogenic material handling.

SUMMARY OF THE INVENTON

In accordance with the present invention a novel and useful cryogenic pressure building system for employment on a mobile cryogenic vessel or tank is provided.

The pressure building system of the present invention utilizes at least one elongated conduit which has an inner wall and an outer wall. The conduit may be constructed of stainless steel or other material which is deemed to be safe in conjunction with flammable cryogenic materials. The inner wall of the conduit is adapted for contact with cryogenic material. Heat is transferred to the cryogenic material through the conduit from the outer wall thereof. The inlet of the conduit is connected to the outlet of the cryogenic tank while the outlet of the conduit may be used for delivery for vaporized cryogenic material or as a pressure boosting device to aid in the discharge of the cryogenic material from the cryogenic vessel.

The system contains at least one elongated conduit having an inner wall and an outer wall. The inner wall of the conduit is intended to contact the cryogenic material for the purpose of heat exchange. The elongated conduit may be constructed of material such as stainless steel which is non-reactive to flammable cryogenic liquids such as hydrogen, oxygen, and the like. The elongated conduit may also include a fin which is bonded to the outer wall, thereof, along the dimension of the elongation of the conduit. The fin would be constructed of heat conductive material and normally would be same material as the elongated conduit. The fin would include a first end portion, a second end portion and an intermediate portion between the first end portion and the second end portion. The first end portion of the fin bonds to the outer wall of the elongated conduit and the second end portion includes a flange which is angularly oriented in relation to the intermediate portion of the fin. The flange permits the fin to be bonded to the outer wall of the conduit along a substantially straight line and increases the heat exchange capabilities of the system of the present invention.

A multiplicity of elongated conduits may also be employed with the system hereindescribed such that at the least one conduit is a first conduit and the system also includes second, third, and fourth conduits. Each of the conduits would include an inlet and an outlet. For example the first and third conduit inlets would communicate with the outlet of the cryogenic tank. Also, the outlets of the first and third conduits would communicate with the inlets of the second and fourth conduits. First and second conduits would be mounted such that the first conduit is placed below the second conduit. The third and fourth conduit would be mounted in a similar arrangement. All the conduits would be angled upwardly to permit the passage of gas through the system.

Thus, a novel and useful pressure building system for cryogenic material has been described.

It is therefore an object of the present invention to provide a pressure building system for cryogenic material which permits the usage of stainless steel as a material in contact with the cryogenic liquid which may be employed on a mobile cryogenic tank.

It is another object of the present invention to provide a pressure building system for cryogenic material which meets governmental specifications for transportation of flammable cryogenic liquids.

It is yet another object of the present invention to provide a pressure building system for cryogenic material which possesses strength to resist vibration and shock normally associated with transportation.

Yet another object of the present invention is to provide a pressure building system for cryogenic material which is capable of being employed as a vaporizer for and use of the cryogenic material or for aiding in the discharge of the cryogenic material from the cryogenic tank.

Another object of the present invention is to provide a pressure building system for cryogenic material which is asthetically acceptable.

The invention possesses other objects and advantages especially as concerns particular characteristics and features thereof which will become apparent as the specification continues.

BRIEF DESCRIPTION OF THE DRAWINGS

FIG. 1 is a side elevational view of the system of the present invention installed on a tank car.

FIG. 2 is a sectional view taken along 2—2 of FIG. 1.

FIG. 3 is a sectional view of a single conduit employed on the system shown in FIG. 1.

FIG. 4 is a top perspective view of a section of the conduit depicted in FIG. 3.

For a better understanding of the invention reference is made to the following detailed description of the preferred embodiments thereof.

BRIEF DESCRIPTION OF THE PREFERRED EMBODIMENTS

Various aspects of the present invention will evolve from the following detailed description of the preferred embodiments which should be taken in conjunction with the heretofore described drawings.

With reference to the drawings, FIG. 1 shows a pressure building system in its entirety and is identified by reference character 10. The system 10 includes as one of its elements a conduit 12, FIGS. 3 and 4, which may be one of a multiplicity of conduits 13, FIGS. 1 and 2. Conduit 12 is shown in place in FIG. 1 and communicates with the outlet 14 of cryogenic tank 16. As depicted in FIG. 1, cryogenic tank 16 is shown as a truck trailer having wheels 18 and 20.

Conduit 12 includes a plurality of fins 22 which extend along the length of conduit 12. With reference to FIG. 3 a fin 24 is shown which includes a first end portion 26, second end portion 28 and an intermediate portion 30. A flange 32 is angularly connected to second end portion 28 and is oriented angularly in relation to intermediate portion 30 thereof. Fin 24 is bonded at second end portion 26 of fin 24 to the outer wall 34 of conduit 12. Such bonding may be achieved by welding or similar processes. In this regard, flange 32 aids such bonding process by maintaining fin 24 in a relatively straight configuration along the length of conduit 12. Flange 32 also adds to the heat exchange capability of system 10 between the ambient air and the exterior of conduit 12 and fin 24. Weld line 36 is typical of such bonding process. Also, it should be noted that the interior wall 38 of conduit 12 is intended for contacting the cryogenic liquid which passes through conduit 12. In FIG. 3, fin 24 is typical of remaining fins of the plurality of fins 22 shown therein. Turning to FIG. 4 it may be seen that conduit 12A includes a plurality of fins bonded to the outer wall 34A thereof. A typical fin 42 includes a first end portion 44, a second end portion 46 and an intermediate portion 48 therebetween. A flange 50 connects to second end portion 46 and is angularly oriented in relation to intermediate portion 48 of fin 42. A flange 52 is connected to first end portion 44 of fin 42. Flange 52 is bonded to the outer wall 34A of conduit 12A by the use of a ceramic glue or the like in the embodiment shown in FIG. 4.

Importantly, the finned conduits 12 and 12A shown in FIGS. 3 and 4 may be constructed entirely of stainless steel which is deemed to be compatible with flammable cryogenic liquids. The plurality of fins 22 and 40 strengthen conduits 12 and 12A by adding rigidity to their structure. Thus, the hereinabove described structure is able to resist vibrations and shock normally associated with water, road, and rail transportation.

With reference to FIGS. 1 and 2 it may be seen that a plurality of conduits 54 may be employed in system 10. For example conduits 56, 58, 60, 62 and 64 may also be employed. As shown in FIG. 2, conduit includes a plurality of fins similar to the fin structure shown in FIG. 3.

In viewing FIG. 1, it may be observed that conduits 12 and 56 are angled upwardly. A cryogenic liquid inlet 14 from tank 16 connects to conduit 12 via a header 66. Conduit 60 and 64 also have inlets connected to header 66, FIG. 2. The outlet 68 of conduit 12 serves as the inlet 70 for conduit 66. The outlet 72 of conduit 56 is directed to the ultimate user for the cryogenic vapor or is directed to the top of cryogenic tank 16 to aid in the pumping of cryogenic liquid therefrom. Thus, system 10 may serve as a vaporizer or as a pump booster. A header 74 connects to the outlet of 72 of conduit 56 and to the outlets of conduits 58 and 62. The use of headers 66 and 72 reduce the pressure drop through the conduits shown in the FIGURES. Also, conduit 56 is angled upwardly as is conduit 12, already described, to form a "vee" configuration permits gases to be easily moved through system 10. Brackets 76 and 78 hold plurality of conduits 54 and headers 66 and 74 to the cryogenic tank 16. Fixation may be accomplished by welding. Members 80, 82, 84 and 86 form a frame structure which aids in the support of system 10 to cryogenic tank 16.

Although plurality of fins 22 and 40 have the configuration shown in the FIGURES, other configuration may be employed such as forming intermediate portion 30 of fin 24 into a curved or angulated element. Flange 32 may include a radius in its attachment to end portion 28 of fin 24, for example.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A pressure building system for cryogenic material adopted for mounting in conjunction with a vehicle comprising:
   a. a mobile tank supported on the vehicle said mobile tank being adapted for carrying cryogenic material;
   b. at least one elongated conduit having an inner wall and an outer wall and angled upwardly, said inner wall of said conduit adapted for contacting the cryogenic material, said conduit having an inlet connected to the outlet connected to said tank of the cryogenic tank and an outlet;
   c. at least one fin bonded to said outer wall of said at least one elongated conduit along the dimension of said elongation of said conduit, said conduit and said fin being constructed of heat conductive material; said at least one elongated conduit and bonded fin comprising a heat exchanger between the cryogenic material within said at least one elongated conduit, and the environment external to said at least one elongated conduit and said at least one fin bonded thereto; said fin being elongated in the direction of elongated in the direction of elongation of said conduit and having a flange there along for adding rigidity; said fin and said conduit being formed of stainless steel;
   d. a support structure for mounting said at least one conduit having at least one fin to the vehicle.

2. The system of claim 1 in which said at least one fin includes a first end portion and a second end portion with an intermediate portion therebetween, said first end portion of said at least one fin being bonded to said outer wall of said at least one elongated conduit, said second end portion of said at least one fin including said flange angularly oriented in relation to said intermediate portion of said at least one fin.

3. The system of claim 2 in which said at least one fin further includes a flange on said first end portion of said at least one fin angularly oriented in relation to said intermediate portion of said at at least one fin, said flange on said first end portion of said at least one fin being bonded to said outer wall of said at least one elongaged conduit.

4. The system of claim 1 in which said at least one elongated conduit is a first conduit and said system further includes a second conduit said inlet of said first conduit communicating with the outlet of the cryogenic tank, said second conduit having an inlet and an outlet, said inlet of said second conduit communicating with said outlet of said first conduit, said first and second conduits being mounted to said support structure with said first conduit being placed below said second conduit.

5. The system of claim 4 in which said first and second conduits are angled upwardly.

6. The system of claim 5 which additionally comprises a third and fourth conduits each having an inlet and an outlet and each being supported by said support structure said inlets of said first and third conduits communicating with a first header, said outlet of said third conduit communicating to said inlet of said fourth conduit, and said outlets of said second and fourth conduits communicating with a second header, said first header communicating with the cryogenic tank.

7. The system of claim 6 in which said third and fourth conduits are angled upwardly.

8. The system of claim 2 in which said at least one fin and at least one conduit are welded to one another.

* * * * *